United States Patent
Shankara Murthy et al.

(10) Patent No.: US 11,243,793 B2
(45) Date of Patent: Feb. 8, 2022

(54) VIRTUAL MACHINE MANAGEMENT

(71) Applicant: HEWLETT PACKARD ENTERPRISE DEVELOPMENT LP, Houston, TX (US)

(72) Inventors: Gandharva Shankara Murthy, Karnataka (IN); Krishna Kanth Mallela, Karnataka (IN); Vinod Kumar, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 248 days.

(21) Appl. No.: 16/268,242

(22) Filed: Feb. 5, 2019

(65) Prior Publication Data
US 2020/0249975 A1     Aug. 6, 2020

(51) Int. Cl.
| | |
|---|---|
| G06F 9/455 | (2018.01) |
| H04L 29/08 | (2006.01) |
| H04L 12/24 | (2006.01) |
| G06F 16/23 | (2019.01) |
| G06F 9/4401 | (2018.01) |

(52) U.S. Cl.
CPC .......... *G06F 9/45558* (2013.01); *H04L 41/12* (2013.01); *H04L 67/10* (2013.01); *G06F 9/4401* (2013.01); *G06F 16/2379* (2019.01); *G06F 2009/45562* (2013.01); *G06F 2009/45595* (2013.01)

(58) Field of Classification Search
CPC ............. G06F 9/45558; G06F 16/2379; G06F 9/4401; G06F 2009/45562; G06F 2009/45595; H04L 41/12; H04L 67/10
See application file for complete search history.

(56) References Cited

U.S. PATENT DOCUMENTS

| | | | |
|---|---|---|---|
| 8,505,003 B2 | 8/2013 | Bowen | |
| 2013/0227089 A1* | 8/2013 | McLeod | G06F 9/45558 709/220 |
| 2015/0288768 A1* | 10/2015 | Goyal | G06F 9/45558 709/228 |
| 2016/0359805 A1 | 12/2016 | Spraggs et al. | |
| 2018/0191582 A1* | 7/2018 | Amendjian | H04L 41/5058 |

OTHER PUBLICATIONS

Herrmann, J.; "Virtualization Getting Started Guide"; printed on Aug. 27, 2018; 22 pages.
Hobo.house; "Workaround for Foreman-Proxy Scale Issue: DHCPD and lots of VM's" Aug. 8, 2015; 3 pages.
IBM; "Overview of the Agent"; printed from webpage: https://www.ibm.com/support/knowledgecenter/en/SS9U76_7.2.0.3/com.ibm.tivoli.itmvs.doc/kvmagent/fac_overview_agent.html; on Aug. 23, 2018; 4 pages.
Rogers, K.: "Setting up KVM on Red Hat Enterprise Linux"; Aug. 18, 2016; 7 pages.
Wikipedia, Hypervisor last edited Dec. 5, 2018 (5 pages).
Wikipedia, Kernel-based Virtual Machine last edited Dec. 6, 2018 (4 pages).
Wikipedia, libvirt last edited Nov. 19, 2018 (3 pages).
Wikipedia, Secure Shell last edited Dec. 11, 2018 (8 pages).
VMware, "VMware Integrated OpenStack Administrator Guide", Nov. 14, 2017, 160 pages.

* cited by examiner

*Primary Examiner* — Wissam Rashid
(74) *Attorney, Agent, or Firm* — Trop, Pruner & Hu, P.C.

(57) ABSTRACT

In some examples, a system installs an agent on a computing node that includes a virtual machine (VM), obtains information of the VM and send the information to a cloud controller that is able to manage a cloud, and manages, in response to control of the cloud controller, the VM using the agent.

19 Claims, 4 Drawing Sheets

VIRTUAL MACHINE MANAGEMENT

BACKGROUND

Cloud computing refers to delivery of services over a network, such as the Internet or other type of network. Tenants of a cloud are able to access the services upon request of the tenants. By using the services of a cloud, provided by a cloud provider, a tenant can avoid the costs associated with maintaining infrastructure including hardware equipment and programs including machine-readable instructions that the tenant would otherwise have to employ.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cloud controller is an entity that can be used to manage a cloud and the cloud's resources. The cloud controller also enables tenants to access services of the cloud. Managing a cloud can include creating services, modifying services, removing services, and so forth. A cloud controller can be implemented in a cloud environment, and can be implemented as a single computing machine or as multiple computing machines to provide high availability.

A tenant can refer to a human user, an enterprise (e.g., a business concern, a government agency, an educational organization, etc.), a machine, or a program (that includes machine-readable instructions). The services of a cloud can include resources such as processing resources (e.g., server computers, processors, etc.), storage resources (e.g., disk drives, solid state memories, memory devices, etc.), communication resources (e.g., routers, switches, gateways, etc.), virtual resources (e.g., virtual machines, containers, virtual networks, etc.), and so forth. Services can also include databases, programs (e.g., applications, operating systems, firmware, or other machine-executable instructions), or other functions.

In examples where a cloud controller is able to deploy or manage virtual resources such as virtual machines (VMs), the cloud controller can be used to spawn VMs. In some examples, the cloud controller is able to create a new hypervisor in a cloud, where the hypervisor (also referred to as a virtual machine monitor or VMM) is responsible for managing execution of VMs and the access of such VMs to physical resources, including processing, storage, and communication resources, for example. The cloud controller can issue a request to boot a VM to a hypervisor, which in turn creates the VM. Examples of hypervisors that can be created by cloud controllers include a Hyper-V hypervisor, a kernel-based virtual machine (KVM) hypervisor, and so forth.

In a non-cloud environment (such as a data center) of an enterprise, servers can host and manage VMs using a vendor-specific virtualization tool, such as the Hyper-V Manager for a Windows-enabled server, the Virt-Manager for a Linux-enabled host, and so forth. The vendor-specific virtualization tool, which is customized for each server, can be used to spawn VMs in the non-cloud environment. If the enterprise transitions to a cloud architecture in which the data center becomes cloud enabled (such that VMs and other resources are controlled by a cloud controller), then the existing VMs hosted on servers of the non-cloud environment cannot be managed by the cloud controller. Since the existing VMs of the non-cloud environment were not spawned by the cloud controller, the cloud controller is not aware of such VMs and thus is unable to manage the VMs.

The enterprise may not be able to import the existing VMs of the non-cloud environment to a cloud environment. In some cases, a human administrator may attempt to manually onboard the existing VMs to the cloud environment by onboarding the hypervisor host and making the existing VMs manageable by cloud controller. Onboarding a VM to the cloud controller can refer to a procedure for integrating the VM for use with the cloud controller. A manual onboarding process may be labor intensive, prone to error, and/or cause extended downtime of the VMs to be onboarded.

Figure 1:
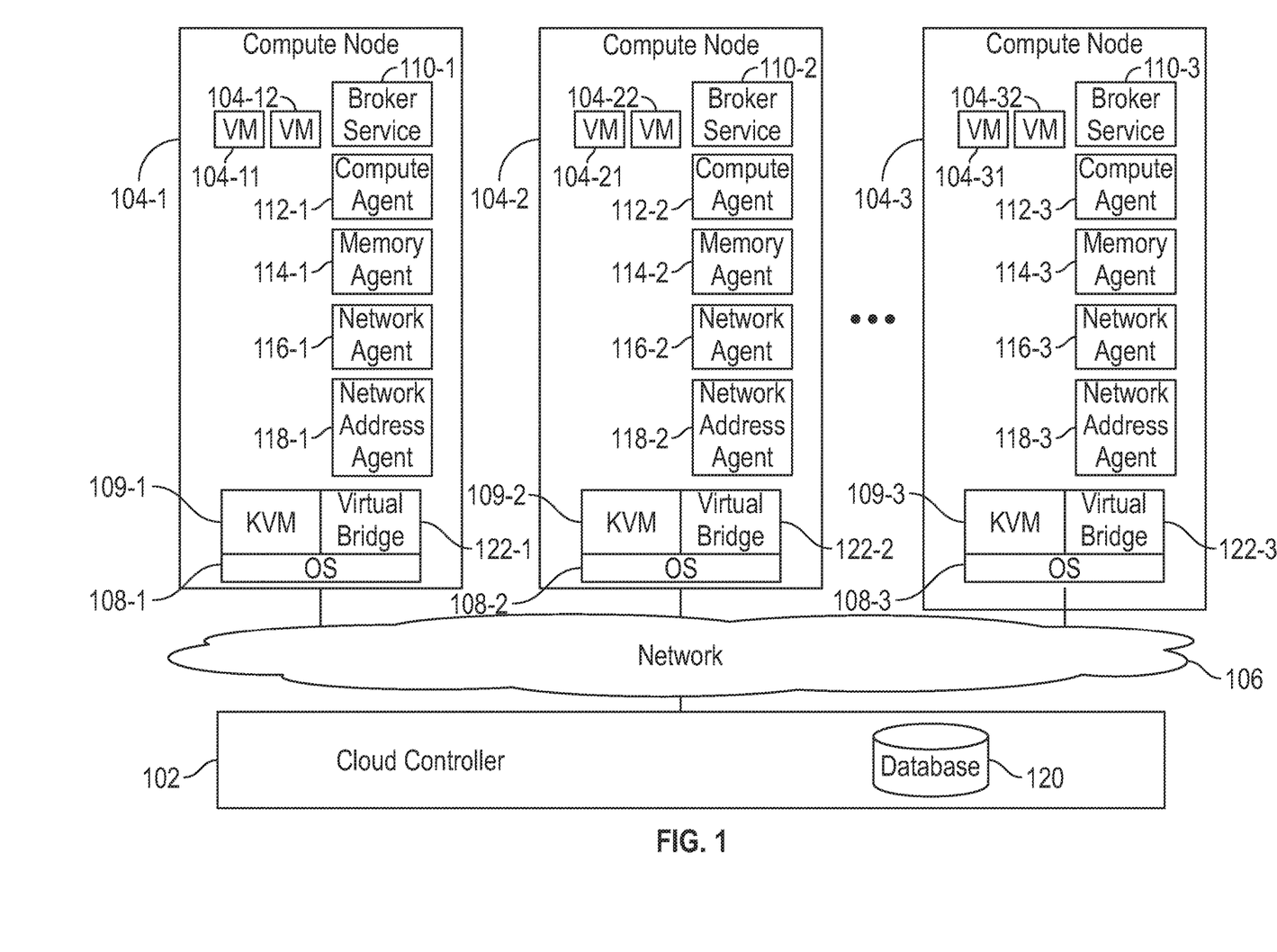
FIG. 1 is a block diagram of an arrangement that includes computing nodes and a cloud controller, according to some examples.

In accordance with some implementations of the present disclosure, as shown in FIG. 1, to allow the onboarding of a VM for use with a cloud controller 102, in scenarios where the VM already exists (in a non-cloud environment) and is not created by the cloud controller 102, a custom service can be installed on a computing node (e.g., a server of the non-cloud environment) on which a VM is already present. As used here, a "computing node" can refer to a computer, a portion of a computer, or multiple computers. The custom service can be referred to as a "broker service." Generally, the broker service can refer to machine-readable instructions executable to interact with a cloud controller to allow onboarding of an existing VM.

FIG. 1 shows compute nodes 104-1, 104-2, and 104-3. Although three compute nodes are shown in FIG. 1, it is noted that in another examples, a different number of compute nodes can be deployed, where the number of compute nodes can include one compute node or more than one compute node.

The compute node 104-1 includes VMs 104-11 and 104-12, the compute node 104-2 includes VMs 104-21 and 104-22, and the compute node 104-3 includes VMs 104-31 and 104-32. In different examples, a different number of VMs can be included in each of the compute nodes.

The cloud controller 102 is coupled to the compute nodes 104-1 to 104-3 over a network 106, which can include a local area network (LAN), a wide area network (WAN), the Internet, and so forth. Each compute node 104-1, 104-2, or 104-3 also includes a respective operating system 108-1, 108-2, or 108-3. In some examples, the operating systems 108-1 to 108-3 are Linux operating systems. In other examples, different types of operating systems can be included in the compute nodes 104-1 to 104-3.

In examples where the operating system 108-1, 108-2, or 108-3 is a Linux operating system, a kernel-based virtual machine (KVM) technology can be supported. A KVM module 109-1, 109-2, or 109-3 (which can be part of the respective operating system 108-1, 108-2, or 108-3) transforms the respective Linux operating system 108-1, 108-2, or 108-3 into a hypervisor that allows the respective compute node 104-1, 104-2, or 104-3 to run VMs.

Although examples refer to Linux operating systems and KVM, it is noted that in other examples, the compute nodes 104-1, 104-2, and 104-3 can include other types of operating systems and other types of hypervisors for supporting VMs.

As shown in FIG. 1, each respective compute node 104-1, 104-2, and 104-3 includes a corresponding broker service 110-1, 110-2, and 110-3. A broker service (implemented as machine-readable instructions) is used to assist in onboarding a VM of a non-cloud environment (e.g., VM 104-11, 104-12, 104-21, 104-22, 104-31, or 104-32) into a cloud managed by the cloud controller 102. The broker service (110-1, 110-2, or 110-3) can install a number of agents on the respective compute node (104-1, 104-2, or 104-3). The agents are used to allow the cloud controller 102 to manage a VM on the compute node. In some examples, such agents installed on a compute node by the respective broker service can include a compute agent, a memory agent, a network agent, and a network address agent (discussed further below).

As shown in FIG. 1, the broker service 110-1 can install a compute agent 112-1, a memory agent 114-1, a network agent 116-1, and a network address agent 118-1 on the compute node 104-1. Similarly, the broker service 110-2 can install respective agents 112-2, 114-2, 116-2, and 118-2 on the compute node 104-2, and the broker service 110-3 can install respective agents 112-3, 114-3, 116-3, and 118-3 on the compute node 104-3.

Although reference is made to specific example agents, it is noted that in other examples, functionalities of these agents can be combined into fewer agents or divided into more agents.

The compute agent 112-1, 112-2, or 112-3 is used to perform virtualization on the respective compute node. For example, the compute agent can be used to boot a VM (which refers to starting up or spawning the VM) or manage the VM (which can include changing a configuration of the VM, such as to cause the VM to run a different application, and so forth) or stop a VM (e.g., remove the VM or pause the VM). The cloud controller 102 can perform management of a VM on a respective compute node using the compute agent running on the respective compute node.

The memory agent 114-1, 114-2, or 114-3 is used to manage a storage for a VM in a compute node, which can involve calculating an amount of storage available to the VM, increasing or decreasing an allocation of storage to the VM, and so forth. The cloud controller 102 can manage the storage for a VM using the memory agent. For example, the cloud controller 102 can interact with the memory agent to obtain the amount of storage available for the VM, or to allocate storage to the VM.

The network agent 116-1, 116-2, or 116-3 can be used to create or manage a network, such as a virtual network. As another example, it can be assumed that the compute node includes a physical network interface, which is a network communication resource that can be divided for use by multiple VMs. For example, the network agent can create or modify a virtual network, or the network agent can allocate usage of the physical network interface among multiple VMs. As another example, the network agent can be used to connect a physical network interface of the respective compute node to a virtual bridge 122-1, 122-2, or 122-3 of the respective compute node. A virtual bridge is used to route information between a physical network interface and VMs in the respective compute node. The cloud controller 102 can interact with the network agent to create, modify, or allocate virtual or physical resources.

The network address agent 118-1, 118-2, or 118-3 can be used to manage network addresses assigned to VMs. Examples of network addresses include an Internet Protocol (IP) address, a Medium Access Control (MAC) address, and so forth. The cloud controller 102 can interact with the network address agent to assign or change network addresses for VMs.

Figure 2:
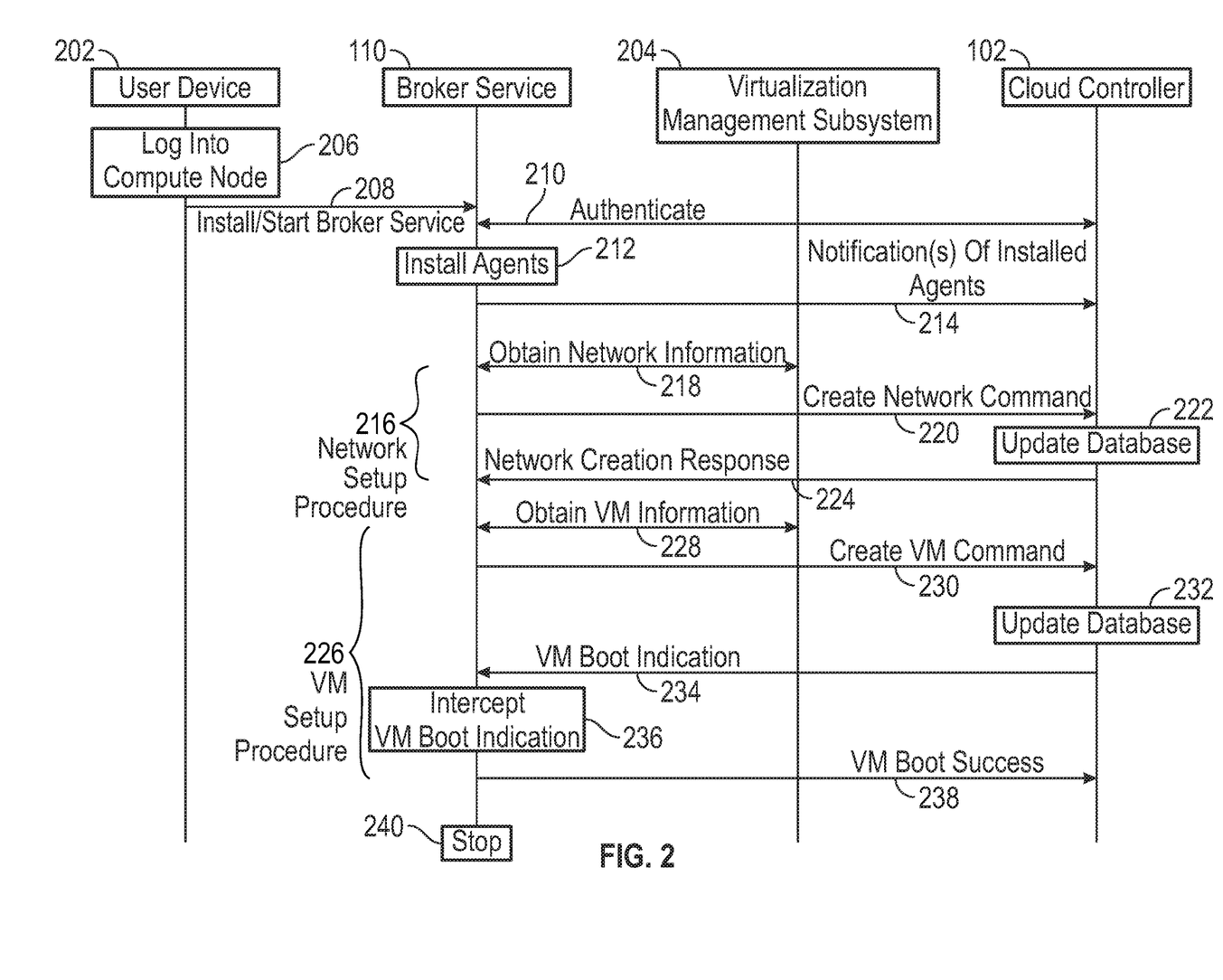
FIG. 2 is a message flow diagram of a process for onboarding virtual machines (VMs) of a non-cloud environment according to some examples.

FIG. 2 is a message flow diagram of a process for onboarding VMs from a non-cloud computing environment, including the compute nodes 104-1, 104-2, and 104-3, for example. The process of FIG. 2 is performed iteratively for each compute node of the non-cloud computing environment.

The process of FIG. 2 involves various entities, including a user device 202, a broker service 110 (e.g., 110-1, 110-2, or 110-3 in FIG. 1), a virtualization management subsystem 204, and a cloud controller 102. An example of the virtualization management subsystem 204 is Libvirt, which is a toolkit that includes a collection of programs in the virtualization management subsystem 204 provides a way to manage VMs and other virtualization functionality. The collection of programs can include a library of routines, such as those associated with an application programming interface (API), a daemon, and a command line utility. The Libvirt toolkit is accessible on a compute node on which a Libvirt daemon is running. The command line utility can be used to submit commands to the Libvirt toolkit.

Although reference is made to Libvirt, it is noted that in other examples, other virtual management subsystems can be used for managing VMs and other virtualization functionality.

As shown in FIG. 2, a user, such as a network administrator, at the user device 202 can log into (at 206) a compute node (e.g., 104-1, 104-2, or 104-3). Examples of user devices include any or some combination of a desktop computer, a notebook computer, a tablet computer, a smartphone, and so forth. Logging into the compute node may involve the user submitting the user's security credentials, such as a username and password, a key, a certificate, or any other credential. In other examples where KVM is not used, the user can log into another type of compute node.

If the user desires to onboard VMs from a non-cloud environment to a cloud managed by the cloud controller 102, the user can make a selection to cause the user device 202 to send (at 208), to the broker service 110, a request to install or start the broker service 110 on the compute node. Installing the broker service can involve obtaining the broker service from a location such as a website, a server, and so forth, loading the broker service on the compute node, and starting the broker service on the compute node. In other examples, the broker service may already be loaded on the compute node, in which case the request can cause the broker service 110 to start executing on the compute node.

Starting the broker service 110 at the compute node is to perform importation (i.e., onboarding) of VM(s) of the compute node to the cloud managed by the cloud controller 102.

The broker service 110 authenticates (at 210) with the cloud controller 102. This authentication can be based on the broker service 110 providing a security credential or other information that can be used by the cloud controller 102 to verify that the broker service 110 is an authorized code, and not malware or some other code. For example, the authentication can be based on credentials provided by the user at the user device 202.

If the broker service 110 successfully authenticates with the cloud controller 102, then the broker service 110 can proceed to perform the remaining tasks of FIG. 2. If the authentication with the cloud controller 102 fails, the broker service 110 stops further processing.

The broker service 110 installs (at 212) the various agents (including the compute agent, the memory agent, the network agent, and the network address agent discussed above) at the compute node. Installing an agent can refer to obtaining the agent from a location such as a website, a server, and so forth, loading the agent on the compute node, and starting the agent on the compute node. In other examples, the agent may already be loaded on the compute node, in which case the broker service 110 start execution of the agent on the compute node The broker service 110 sends (at 214), to the cloud controller 102, notification(s) of the installed agents. In some examples, the broker service 110 can send a separate notification (in the form of a message or other information) to the cloud controller 102 in response to installation of each agent. In other examples, the broker service 110 can send one notification of the multiple agents that have been installed.

The notification(s) of the installed agents can include a network address of the compute node on which the agents are installed. In examples where the compute node includes a KVM module (e.g., 109-1, 109-2, or 109-3), the notification(s) can include a name of a KVM host, which is a compute node enabled to provide KVM functionality. The notification(s) can also include identifiers of the installed agents. The notification(s) can also provide resource information of resources of the compute node, such as information pertaining to a processing resource (including a processor or a core of a processor, for example) of the compute node, a storage resource (including a memory and/or persistent storage) of the compute node, and other resources. The information relating to the resources of the compute node can be used by the cloud controller 102 to decide whether or not to spawn a new VM on the compute node. For example, the cloud controller 102 can determine based on the resource information that a first compute node may be more optimal to spawn a new VM than a second compute node, such as because the first compute node has a greater amount of resources than the second compute node.

As shown in FIG. 1, the cloud controller 102 includes or has access to a database 120 (stored in a storage medium) that contains information relating to various agents installed at each respective compute node. The database 120 further includes other information, such as the information of the notification(s) discussed above. Additionally, as discussed further below, the database 120 can also store information relating to networks used by VMs and information of VMs.

In response to the notification(s) of the installed agents, the cloud controller 102 can update the database 120 to add information relating to the installed agents and other information included in the notification(s). The information stored in the database 120 can identify which agents are installed on the compute node. Based on the information of the installed agents on the compute node, the cloud controller 102 can determine whether or not management of the VMs on the compute node is possible. For example, if any of the compute agent, memory agent, network agent, and network address agent is missing, then the cloud controller 102 can determine that management of the VMs on the compute node is not possible.

The broker service 110 also initiates a network setup procedure 216, to set up each network that is used by VM(s) of the compute node (these are the VM(s) that are to be onboarded to the cloud managed by the cloud controller 102. The network setup procedure 216 is iterated for each network that is used by the VM(s) of the compute node. The network to be set up can include a virtual network or a physical network.

The broker service 110 obtains (at 218) network information of a network used by a VM to be onboarded. To obtain the network information, the broker service 110 can send a command to the virtualization management subsystem 204 to fetch the network information. For example, if the virtualization management subsystem 204 includes the Libvirt toolkit, then a fetch command can be issued using the command line utility of Libvirt. The virtualization management subsystem 204 can maintain information relating to networks used by VMs of the compute node. In response to the fetch command, the virtualization management subsystem 204 can retrieve the relevant network information and provide the retrieved network information to the broker service 110.

The network information that is obtained can include any or some combination of the following: a name of the network, a Classless Inter-Domain Routing (CIDR) information of the network, an identifier of a virtual local area network (VLAN), and so forth. Based on the obtained network information of the network, the broker service 110 sends (at 220), to the cloud controller 102, a create network command. The create network command can include any or some combination of the network information listed above. A "command" can refer to a message, an information element, or any other indication to cause a recipient of the command to perform a specified action.

In response to the create network command, the cloud controller 102 creates (at 222) a network using the network information received with the create network command. Note that the network that is created is created in the database 120 of the cloud controller 102—in other words, the database 120 is updated by adding information of the "created" network to an entry of the database corresponding to the compute node with VMs that are to be onboarded to the cloud managed by the cloud controller 102. Note that the cloud controller 102 does not actually create at the network in response to the create network command, since the network already exists and is in use by a VM(s) to be onboarded. Updating the database 120 with the network information effectively registers the network with the cloud controller 102, such that the cloud controller 102 is aware of the network that to be used by an onboarded VM(s).

In response to the create network command, the cloud controller 102 sends (at 224) a network creation response to the broker service 110. If the network creation is successful (i.e., the network information was successfully added to the database 120), then the cloud controller 102 provides a success acknowledgement (at 220) in the network creation response. However, if the network creation is not successful, the cloud controller 102 provides a failure indication in the network creation response.

The broker service 110 also initiates a VM setup procedure 226, which is iteratively performed for each respective VM of multiple VMs to be onboarded. In the VM setup procedure 226, the broker service 110 obtains (at 228) VM information of an existing VM to be onboarded. To obtain the VM information, the broker service 110 can send a command to the virtualization management subsystem 204 to fetch the VM information. For example, if the virtualization management subsystem 204 includes the Libvirt toolkit, then a fetch command can be issued using the command line utility of Libvirt. The virtualization management subsystem 204 can maintain information relating to VMs of the compute node. In response to the fetch command, the virtualization management subsystem 204 can retrieve the relevant VM information and provide the retrieved VM information to the broker service 110.

In some examples, the VM information that is returned can include a name of the VM, an identifier of a network used by the VM, an image name that refers to an image (including machine-readable instructions) for the VM, a network address (e.g., an IP address) of the VM, and so forth.

The broker service 110 sends (at 230) a create VM command to the cloud controller 102, where the create VM command can include the obtained VM information. The cloud controller 102 updates (at 232) the database 120 with the VM information. For example, the cloud controller 102 can add the VM information of the VM to an entry of the database 120 corresponding to the compute node on which the VM is present. Updating the database 120 with the VM information effectively registers the VM with the cloud controller 102, such that the cloud controller 102 is aware of the VM to be onboarded.

In response to the create VM command, if the cloud controller 102 successfully updated the database 120, the cloud controller 102 sends (at 234) a VM boot indication to the broker service 110.

The VM boot indication is intercepted (at 236) by the broker service 110, which does not forward the VM boot indication to the hypervisor (e.g., the OS configured as a hypervisor) of the compute node. Note that the VM boot indication is a VM create indication which would have caused creation of a VM at the compute node—the broker service 110 intercepts the VM boot indication to prevent creation of a VM in response to the VM boot indication. Note that the VM already exists at the compute node, such that the VM does not have to be created at the compute node.

In response to the VM boot indication, the broker service 110 sends (at 238) a VM boot success to the cloud controller 120, to inform the cloud controller 120 that the VM was successfully "booted." Note that a VM was not actually booted at the compute node, since the VM already exists at the compute node.

After the onboarding of VM(s) of the compute node has been completed, the broker service 110 of the compute node can be stopped (at 240)—i.e., the broker service 110 stops executing in the compute node.

The process of FIG. 2 can be re-iterated for each compute node of multiple compute nodes with VM(s) to be onboarded.

Figure 3:
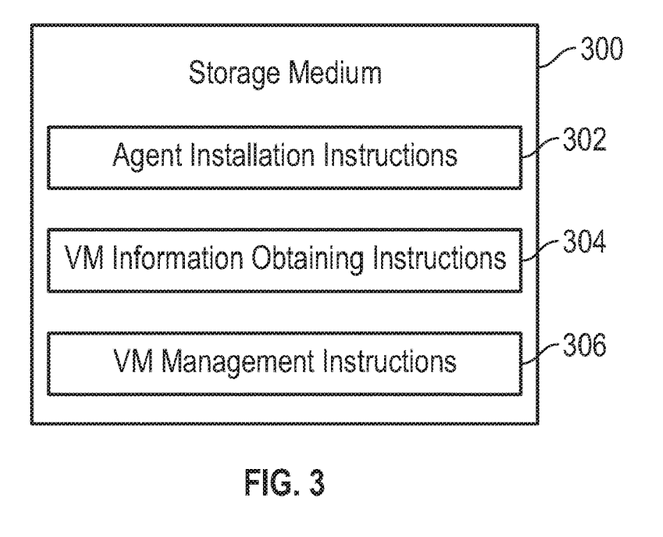
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The machine-readable instructions include agent installation instructions 302 to install an agent on a computing node that includes a VM. The VM is a VM that is part of a non-cloud environment to be onboarded into a cloud managed by a cloud controller. This VM that is part of the non-cloud environment was not created by the cloud controller. The agent installed can include any or some combination of the compute agent, memory agent, network agent, and network address agent discussed above. The agent installation instructions 302 can be part of the broker service 110 discussed above.

The machine-readable instructions further include VM information obtaining instructions 304 to obtain information of the VM and send the information to a cloud controller that is able to manage a cloud. The VM information obtaining instructions 304 can be part of the broker service 110 for example, and obtaining the information of the VM can be performed as part of the VM setup procedure 226 of FIG. 2, for example.

The machine-readable instructions further include VM management instructions 306 to manage, in response to control of the cloud controller, the VM using the agent. The VM management instructions 306 can be part of the OS (e.g., 108-1, 108-2, or 108-3 of FIG. 1), for example, or part of a hypervisor, that cooperates with the agent to manage the VM. Whenever the cloud controller 102 is to manage the VM, the cloud controller 102 invokes the respective agent. The "control" of the cloud controller can include commands sent from the cloud controller to the compute node, such as the hypervisor in the compute node, to cause the corresponding agent to be invoked to perform the VM management task.

For example, the cloud controller 102 can interact with a compute agent (e.g., 112-1, 112-2, or 112-3 of FIG. 1) to start a VM, modify a VM, or stop a VM. As another example, the cloud controller 102 can interact with a memory agent (e.g., 114-1, 114-2, or 114-3 of FIG. 1) to manage a storage for a VM. As a further example, the cloud controller 102 can interact with a network agent to create or manage a network used by a VM, and interact with a network address agent to assign or manage a network address assigned to a VM.

Figure 4:
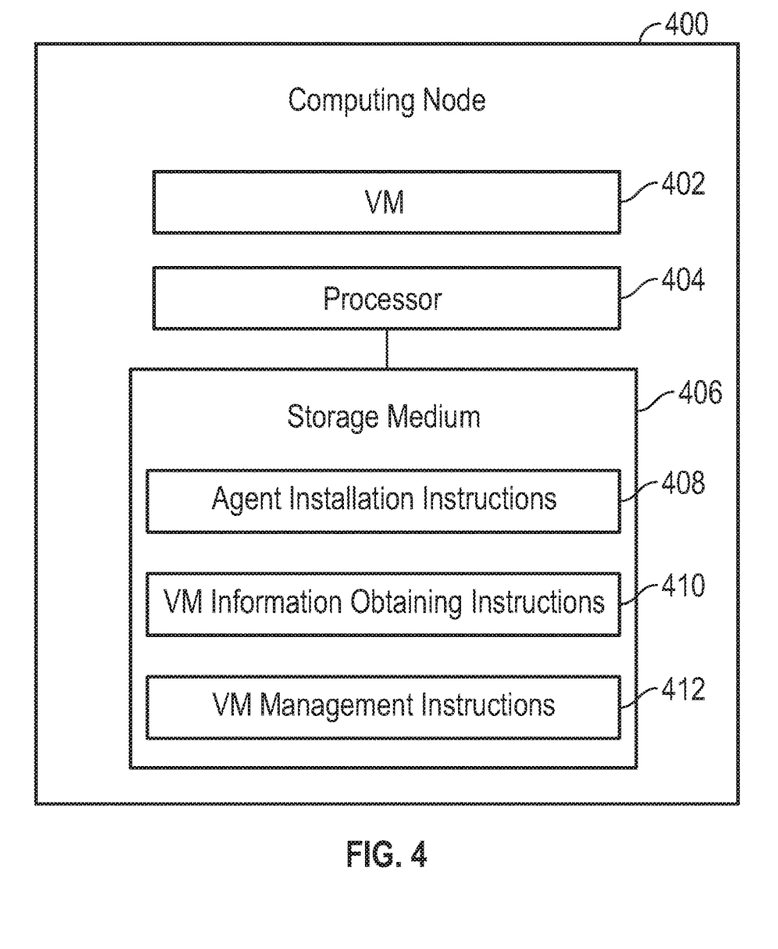
FIG. 4 is a block diagram of a computing node according to some examples.

FIG. 4 is a block diagram of a computing node 400 including a VM 402, a hardware processor 404, and a storage medium 406 storing machine-readable instructions that are executable on the hardware processor 404 to perform various tasks. A hardware processor can include a microprocessor, a core of a multi-core microprocessor, a microcontroller, a programmable integrated circuit, a programmable gate array, a digital signal processor, or another hardware processing circuit. Machine-readable instructions executable on a hardware processor can refer to the instructions executable on a single hardware processor or the instructions executable on multiple hardware processors.

The machine-readable instructions include agent installation instructions 408 to install an agent on the computing node 400. The machine-readable instructions further include VM information obtaining instructions 410 to obtain information of the VM and send a request to create a VM to a cloud controller that is able to manage a cloud. The request includes the information of the VM in the computing node, and the request to create a VM causes the VM in the computing node to be registered with the cloud controller.

The machine-readable instructions further include VM management instructions 412 to manage, in response to control of the cloud controller, the VM using the agent.

Figure 5:
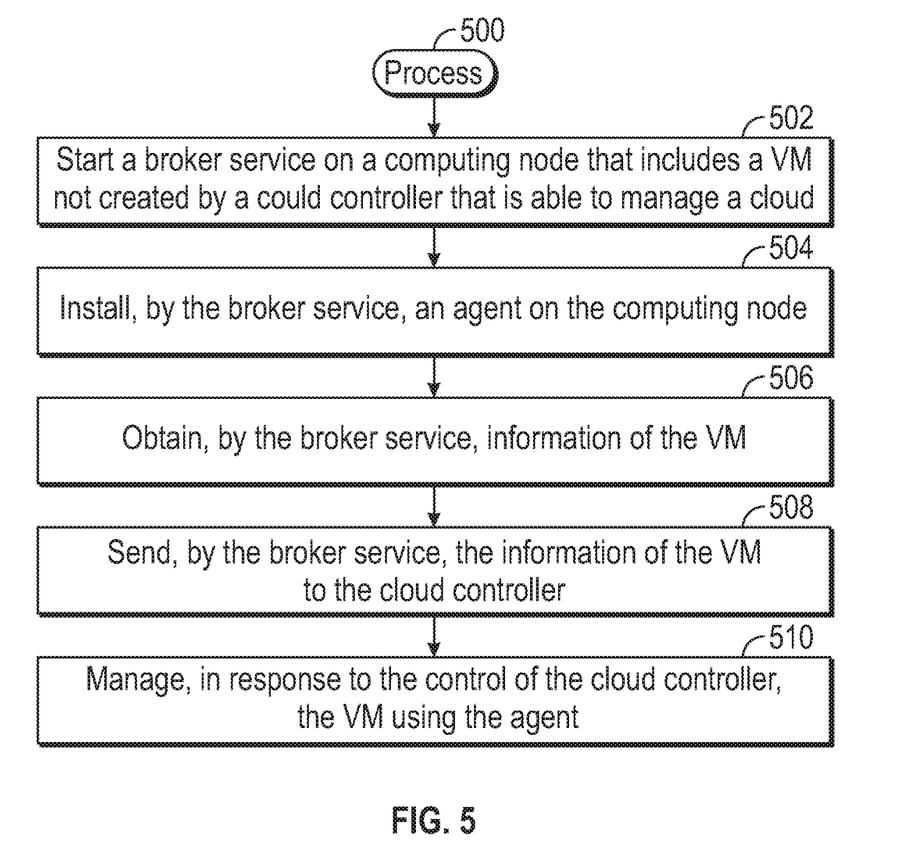
FIG. 5 is a flow diagram of a process according to further examples.

FIG. 5 is a flow diagram of a process 500 according to some examples. The process 500 includes starting (at 502)

a broker service on a computing node that includes a VM not created by a cloud controller that is able to manage a cloud. The broker service can be started as part of a process to onboard VM(s) in a non-cloud environment.

The process 500 includes installing (at 504), by the broker service, an agent on the computing node. The installed agent can include any or some combination of a compute agent, a memory agent, a network agent, and a network address agent.

The process 500 includes obtaining (at 506), by the broker service, information of the VM. The obtaining of the VM information can be based on sending a command to a virtualization management subsystem (e.g., 204 in FIG. 2), such as a Libvirt toolkit.

The process 500 includes sending (at 508), by the broker service, the information of the VM to the cloud controller. The information of the VM can be sent with a create VM command. The process 500 further includes managing (at 510), in response to control of the cloud controller, the VM using the agent.

A storage medium (e.g., 300 in FIG. 3 or 406 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   install an agent on a computing node that includes a virtual machine (VM);
   obtain information of the VM and send the information to a cloud controller that is able to manage a cloud;
   manage, in response to control of the cloud controller, the VM using the agent; and
   install an additional agent on the computing node, the additional agent selected from among a network agent to create or manage a network used by the VM, a memory agent to manage storage for the VM, or a network address agent to manage assignment of a network address to the VM, wherein the agent is a compute agent.

2. The non-transitory machine-readable storage medium of claim 1, wherein the cloud controller is able to create a VM, and the VM in the computing node is a VM not created by the cloud controller.

3. The non-transitory machine-readable storage medium of claim 1, wherein obtaining the information of the VM is performed by a service executed on the computing node, and wherein the instructions upon execution cause the system to:
   send, by the service, the information of the VM to the cloud controller as part of a request to create a VM.

4. The non-transitory machine-readable storage medium of claim 3, wherein the instructions upon execution cause the system to:
   receive, by the service, a VM create indication from the cloud controller responsive to the request; and
   intercept, by the service, the VM create indication to prevent a creation of a VM in response to the VM create indication.

5. The non-transitory machine-readable storage medium of claim 3, wherein the agent is installed by the service executed on the computing node.

6. The non-transitory machine-readable storage medium of claim 5, wherein the instructions upon execution cause the system to:
   install the service on the computing node to import the VM to the cloud managed by the cloud controller.

7. The non-transitory machine-readable storage medium of claim 5, wherein the instructions upon execution cause the system to:
   notify, by the service, the cloud controller of the installed agent.

8. The non-transitory machine-readable storage medium of claim 1, wherein the VM is to communicate over a network, and wherein the instructions upon execution cause the system to:
   obtain information of the network and send the information of the network to the cloud controller with a create network command, to cause the cloud controller to update a database with the information of the network.

9. The non-transitory machine-readable storage medium of claim 8, wherein the network is a virtual network.

10. A computing node comprising:
    a virtual machine (VM);
    a processor; and
    a non-transitory machine-readable storage medium storing instructions that are executable on the processor to:
       install an agent on the computing node;
       obtain information of the VM and send a request to create the VM to a cloud controller that is able to manage a cloud, the request including the information of the VM in the computing node, and wherein the request to create the VM causes the VM in the computing node to be registered with the cloud controller;
       manage, in response to control of the cloud controller, the VM using the agent; and
    install an additional agent on the computing node, the additional agent selected from among a network agent to create or manage a network used by the VM, a memory agent to manage storage for the VM, or a network address agent to manage assignment of a network address to the VM, wherein the agent is a compute agent.

11. The computing node of claim 10, wherein the information of the VM in the computing node includes a network address of the VM.

12. The computing node of claim 10, wherein the instructions are executable on the processor to:
   obtain information of a network used by the VM in the computing node; and
   send, to the cloud controller, a request to create a network based on the information of the network used by the VM in the computing node, the request to cause registration of the network at the cloud controller.

13. The computing node of claim 12, wherein the instructions are executable on the processor to:
   receive, from the cloud controller, an indication of successful creation of the network.

14. The computing node of claim 13, wherein the information of the network used by the VM in the computing node includes a given name or given identifier of the network used by the VM in the computing node, and wherein the network registered with the cloud controller has the given name or given identifier.

15. The computing node of claim 14, wherein the information of the VM in the computing node includes a network address of the VM and the given name or given identifier of the network.

16. The computing node of claim 10, wherein the instructions are executable on the processor to:
   receive a VM create indication from the cloud controller responsive to the request to create a VM; and
   intercept the VM create indication to prevent a creation of a VM at the computing node in response to the VM create indication.

17. A method comprising:
   starting a broker service on a computing node that includes a virtual machine (VM) not created by a cloud controller that is able to manage a cloud;
   installing, by the broker service, an agent on the computing node;
   obtaining, by the broker service, information of the VM;
   sending, by the broker service, the information to the cloud controller;
   managing, in response to control of the cloud controller, the VM using the agent; and
   installing an additional agent on the computing node, the additional agent selected from among a network agent to create or manage a network used by a VM, a memory agent to manage storage for the VM, or a network address agent to manage assignment of a network address to a VM, wherein the agent is a compute agent.

18. The method of claim 17, wherein installing of the agent and the sending of the information of the VM to the cloud controller is part of onboarding the VM in a cloud managed by the cloud controller, the method further comprising:
   stopping the broker service after the onboarding has completed.

19. The method of claim 17, further comprising:
   obtaining, by the broker service, information of a virtual network used by the VM;
   sending, by the broker service to the cloud controller, a request to create a virtual network based on the information of the virtual network used by the VM; and
   receiving, by the broker service from the cloud controller, an indication of successful creation of the virtual network.

* * * * *